United States Patent
Dinker et al.

(10) Patent No.: US 8,005,979 B2
(45) Date of Patent: Aug. 23, 2011

(54) SYSTEM AND METHOD FOR UNIQUELY IDENTIFYING PROCESSES AND ENTITIES IN CLUSTERS

(75) Inventors: Darpan Dinker, San Jose, CA (US); Pramod Gopinath, Union City, CA (US); Mahesh Kannan, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 2689 days.

(21) Appl. No.: 10/281,543

(22) Filed: Oct. 28, 2002

(65) Prior Publication Data

US 2004/0098490 A1    May 20, 2004

(51) Int. Cl.
*G06F 15/173* (2006.01)
*G06F 9/46* (2006.01)
(52) U.S. Cl. ............ 709/238; 709/223; 718/105
(58) Field of Classification Search ........... 709/238, 709/223–226, 246; 718/105
See application file for complete search history.

(56) References Cited

U.S. PATENT DOCUMENTS

| | | | |
|---|---|---|---|
| 5,454,108 A | 9/1995 | Devarakonda et al. | |
| 5,634,122 A | 5/1997 | Loucks et al. | |
| 5,666,486 A | 9/1997 | Alfieri et al. | |
| 5,684,807 A | 11/1997 | Bianchini et al. | |
| 5,812,780 A | 9/1998 | Chen et al. | |
| 5,852,747 A | 12/1998 | Bennett et al. | |
| 5,913,213 A | 6/1999 | Wikstrom et al. | |
| 5,951,694 A * | 9/1999 | Choquier et al. | 714/15 |
| 6,002,868 A | 12/1999 | Jenkins et al. | |
| 6,006,259 A * | 12/1999 | Adelman et al. | 709/223 |
| 6,032,216 A | 2/2000 | Schmuck et al. | |
| 6,067,559 A | 5/2000 | Allard et al. | |
| 6,097,380 A | 8/2000 | Crites et al. | |
| 6,108,699 A | 8/2000 | Moiin | |
| 6,167,490 A | 12/2000 | Levy et al. | |
| 6,175,931 B1 | 1/2001 | Hornung | |
| 6,192,401 B1 | 2/2001 | Modiri et al. | |
| 6,249,879 B1 | 6/2001 | Walker et al. | |
| 6,324,492 B1 | 11/2001 | Rowe | |
| 6,330,689 B1 | 12/2001 | Jin et al. | |
| 6,430,335 B1 | 8/2002 | Carberry et al. | |
| 6,477,172 B1 | 11/2002 | Burger et al. | |
| 6,480,473 B1 | 11/2002 | Chambers et al. | |
| 6,512,740 B1 | 1/2003 | Baniewicz et al. | |
| 6,522,995 B1 | 2/2003 | Conti et al. | |
| 6,532,494 B1 | 3/2003 | Frank et al. | |
| 6,567,808 B1 | 5/2003 | Eschelbeck et al. | |

(Continued)

OTHER PUBLICATIONS

"Concurrency Service Specification," Published Apr. 2000; Object Management Group.

(Continued)

*Primary Examiner* — Peling A Shaw
(74) *Attorney, Agent, or Firm* — Robert C. Kowert; Meyertons, Hood, Kivlin, Kowert & Goetzel, P.C.

(57) ABSTRACT

Entities within a cluster are uniquely identified with a node ID and an engine ID. The node ID uniquely identifies a node within a cluster of nodes and the engine ID uniquely identifies one of several engines included in the node. Entities may be further identified with a cluster ID, an engine type ID, and/or a virtual server ID. At least some of these IDs may be included in communications received from clients and used to route the communications to the cluster entity identified by the included IDs.

60 Claims, 7 Drawing Sheets

U.S. PATENT DOCUMENTS

| | | | |
|---|---|---|---|
| 6,574,197 B1 | 6/2003 | Yaguchi et al. | |
| 6,591,295 B1 | 7/2003 | Diamond et al. | |
| 6,718,394 B2 | 4/2004 | Cain et al. | |
| 6,748,429 B1 | 6/2004 | Talluri et al. | |
| 6,748,554 B2 | 6/2004 | Jin et al. | |
| 6,801,937 B1 | 10/2004 | Novaes et al. | |
| 6,816,905 B1 * | 11/2004 | Sheets et al. | 709/226 |
| 6,820,210 B1 | 11/2004 | Daruwalla et al. | |
| 6,847,993 B1 | 1/2005 | Novaes et al. | |
| 6,895,401 B2 | 5/2005 | Skinner et al. | |
| 6,920,474 B2 * | 7/2005 | Walsh et al. | 709/200 |
| 6,928,378 B2 | 8/2005 | Lebee et al. | |
| 6,944,788 B2 | 9/2005 | Dinker et al. | |
| 6,961,769 B2 | 11/2005 | Arora et al. | |
| 2001/0010053 A1 | 7/2001 | Ben-Shachar et al. | |
| 2001/0014097 A1 | 8/2001 | Beck et al. | |
| 2001/0027453 A1 | 10/2001 | Suto | |
| 2001/0040895 A1 | 11/2001 | Templin | |
| 2002/0042693 A1 | 4/2002 | Kamp et al. | |
| 2002/0062372 A1 | 5/2002 | Hong et al. | |
| 2002/0073080 A1 | 6/2002 | Lipkin | |
| 2002/0091750 A1 | 7/2002 | Kasaravalli et al. | |
| 2002/0143958 A1 | 10/2002 | Montero et al. | |
| 2002/0152307 A1 * | 10/2002 | Doyle et al. | 709/225 |
| 2003/0110445 A1 | 6/2003 | Khaleque | |
| 2003/0131041 A1 | 7/2003 | Dinker et al. | |
| 2003/0154202 A1 | 8/2003 | Dinker et al. | |
| 2003/0204509 A1 | 10/2003 | Dinker et al. | |
| 2003/0204623 A1 | 10/2003 | Cain | |
| 2003/0204786 A1 | 10/2003 | Dinker et al. | |
| 2004/0044672 A1 | 3/2004 | Spencer | |
| 2004/0059805 A1 | 3/2004 | Dinker et al. | |
| 2004/0066741 A1 | 4/2004 | Dinker et al. | |
| 2004/0103098 A1 | 5/2004 | Mitra | |
| 2004/0162885 A1 | 8/2004 | Garg et al. | |
| 2004/0199815 A1 | 10/2004 | Dinker et al. | |

OTHER PUBLICATIONS

Devarakonda, Murthy et al., "Recovery in the Calypso Filesystem," ACM Transactions on Computer Systems, vol. 14, No. 3, Aug. 1996, pp. 287-310.

\* cited by examiner

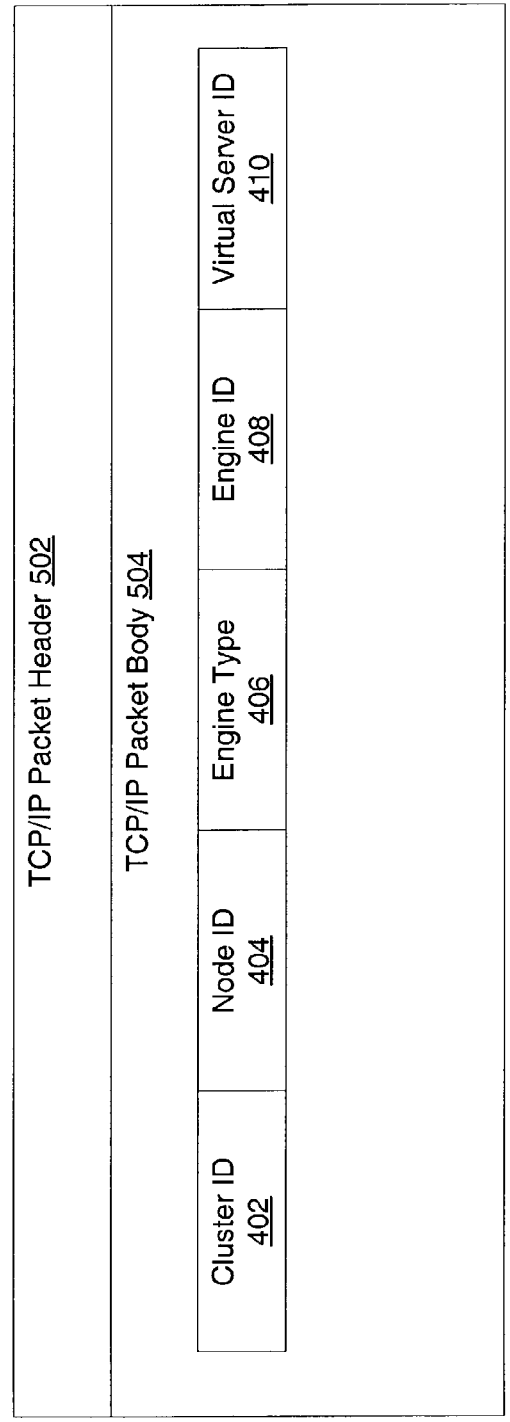

SYSTEM AND METHOD FOR UNIQUELY IDENTIFYING PROCESSES AND ENTITIES IN CLUSTERS

BACKGROUND OF THE INVENTION

1. Field of the Invention

The present invention relates to clusters of nodes included in computer networks and, in particular, to uniquely identifying entities included in such clusters.

2. Description of Related Art

In computer networks, nodes may interact through requests for data, services, or other resources. Client nodes may generate requests and server nodes may service those requests. Nodes may be stand-alone computers, servers, or other computing devices as well as virtual machines. Nodes may be grouped into clusters to provide heightened availability and/or scalability when servicing client requests.

External client nodes may view a cluster as a single entity. Accordingly, communications between an external client and a cluster typically include an ID that identifies the external client node and a node within the cluster. The node in the cluster with which the client is communicating is typically not identified, however. For example, in a cluster of web servers, each computing machine in a TCP/IP network has a unique IP address. When a user requests a URL via a web browser, directory and/or naming services provide an IP address of a server, which is used to establish a connection with that server. However, each server in a cluster has a unique IP address, so it is difficult to provide a single URL that maps to all of the servers in the cluster.

One existing solution to this addressing problem uses an intelligent naming service, such as a hybrid DNS server, that associates a name with a set of IP addresses representing the addresses of all the servers in the cluster. However, naming services are typically unable to make sophisticated decisions about which IP address to return at any given time. For example, a naming service is typically unaware of the number of open connections at each node, and thus cannot select an IP address in order to improve load balancing. Naming services are also typically unaware about factors such as the functionality provided by each server and/or the location of each server, and thus cannot additionally optimize selection of which IP address to return based on these factors. An alternative approach returns the IP address of a "gateway" node for a particular URL. The gateway node may select another cluster node (e.g., based on location, functionality, load, etc.) to which a particular client request should be redirected.

As the above examples show, the inability to directly identify a cluster (as opposed to a particular node) within a client request may complicate the routing of client requests to, from, and within a cluster. When a node fails, communication within the cluster may be further aggravated. For example, if a client established a connection with a node that subsequently fails, a client communication sent to the node after the node's failure may not provide enough information to easily redirect the client communication to another node within the cluster. Instead, the entire address translation process may have to begin again. Furthermore, in many situations, only certain nodes within a cluster may have copies of data needed to respond to the client request. Accordingly, rerouting a client request due to the unavailability of the original cluster node may additionally be complicated by the distribution of data within the cluster.

Another problem in communicating within a cluster is that existing solutions often fail to uniquely identify entities (e.g., processes or applications) within a cluster. This may additionally complicate routing when entities fail. Thus, it is desirable to distinctly identify clusters and entities within clusters in order to more efficiently route client communications both within and between nodes.

SUMMARY

Various embodiments of systems and methods uniquely identify entities within clusters with a node ID and an engine ID. In some embodiments, entities may be further identified with a cluster ID, an engine type ID, and/or a virtual server ID. At least some of these IDs may be included in communications received from clients and used to route the communications to the cluster entity identified by those IDs. In one embodiment, a method involves: receiving a communication from a client; routing the communication to a node included in a cluster of nodes, where the node is identified by a node ID included in the communication; and routing the communication within the node to an engine of a plurality of engines included in the node, where the engine is identified by an engine ID included in the communication. The node ID uniquely identifies the node among the cluster of nodes and wherein the engine ID uniquely identifies the engine among the plurality of engines included in the node.

IDs that uniquely identify cluster entities may also be used to reroute communication if an identified cluster entity fails. For example, if a communication received from a client includes a node ID and an engine ID and the engine identified by the engine ID has failed, the communication may be rerouted to another engine of an engine type specified by an engine type ID included in the communication.

BRIEF DESCRIPTION OF THE DRAWINGS

A better understanding of the present invention can be obtained when the following detailed description is considered in conjunction with the following drawings, in which:

FIG. 4 illustrates an ID used to identify an engine within a cluster node, according to one embodiment.

FIG. 5 illustrates an ID encapsulated in a TCP/IP packet, according to one embodiment.

While the invention is described herein by way of example for several embodiments and illustrative drawings, those skilled in the art will recognize that the invention is not limited to the embodiments or drawings described. It should be understood that the drawings and detailed description are not intended to limit the invention to the particular form disclosed but, on the contrary, the intention is to cover all modifications, equivalents, and alternatives falling within the spirit and scope of the present invention as defined by the appended claims. The headings used are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
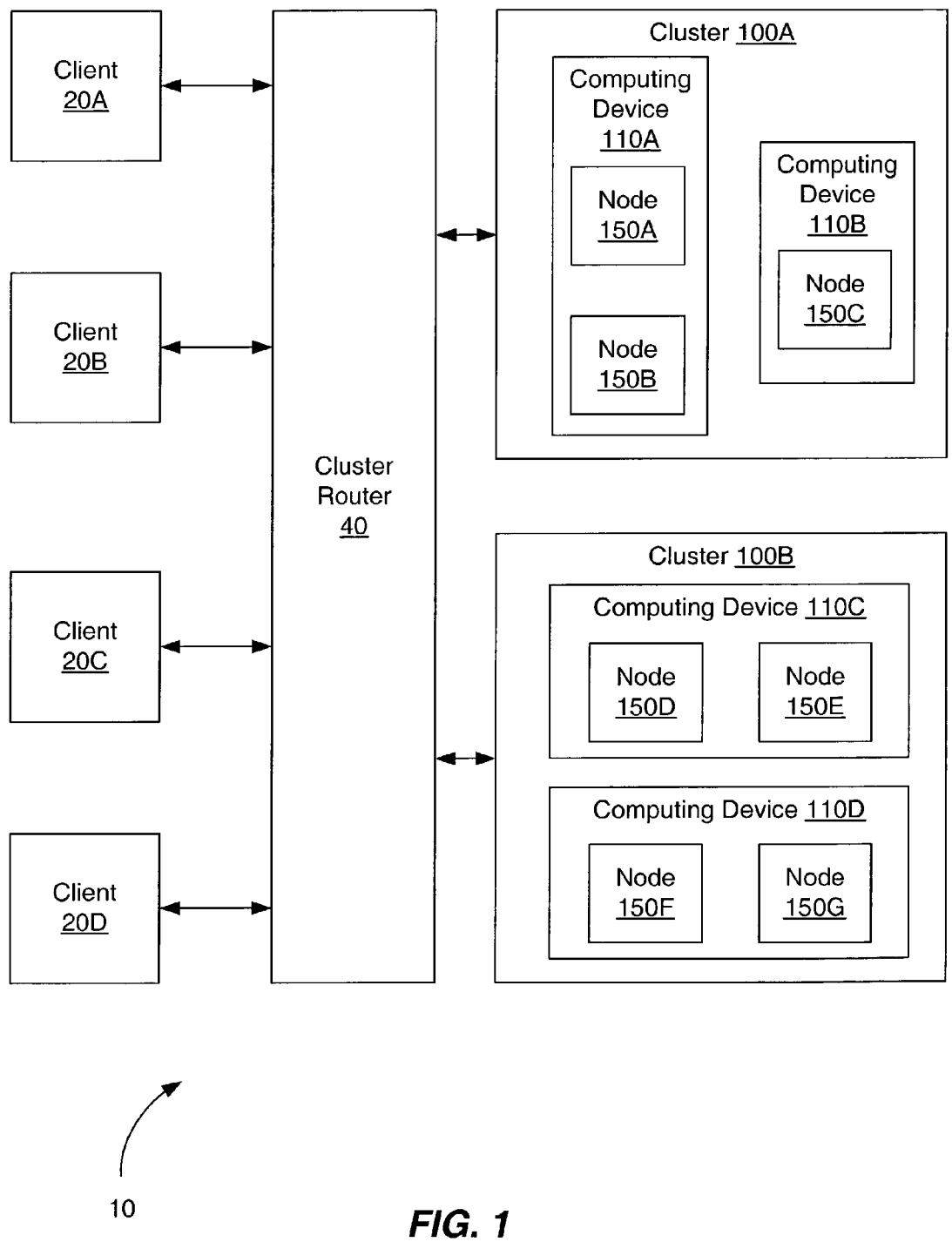
FIG. 1 is a block diagram of one embodiment of a networked system.

FIG. 1 illustrates one embodiment of a networked system that includes several clients 20A-20D, an inter-cluster router 40, and several clusters 100A and 100B. Each cluster 100 includes several nodes 150. The nodes within each cluster 100A and 100B may also act as client nodes, both when communicating with other nodes within the same cluster and when communicating with nodes in other clusters. Throughout this disclosure, components referred to by the same reference number followed by a letter (e.g., clients 20A-20D) may be collectively referred to by that reference number alone (e.g., clients 20).

From the perspective of clients 20, each cluster 100 is a single system that provides a set of one or more applications, system resources, and/or data to clients 20. Within each cluster 100, the nodes 150 included in that cluster cooperatively communicate with each other to provide these applications, system resources, and/or data. Each node 150 runs its own process(es) in order to respond to client requests and to maintain the cluster. As used herein, a "node" 150 may be a stand-alone computer, server, or other computing device, as well as a virtual machine, thread, process, or combination of such elements.

In some embodiments, data stored within a cluster 100 may be distributed among and/or replicated on the nodes 150 within that cluster. Each node may control access to a particular portion of the data stored by the cluster. If data is replicated within the cluster (e.g., primary and backup copies of the same data are maintained by different nodes within the cluster), several nodes may control access to the same portions of the data.

A "cluster" 100 is a group of nodes that provide high availability and/or other properties, such as load balancing, failover, and scalability. For example, replicating data within a cluster may lead to increased availability and failover with respect to a single node failure. Similarly, subsets of a cluster's data may be distributed among several nodes based on subset size and/or how often each subset of data is accessed, leading to more balanced load on each node. Furthermore, a cluster may support the dynamic addition and removal of nodes, leading to increased scalability.

Within each cluster 100, there may be multiple host computing devices 110. These computing devices may, in many embodiments, be servers that include several microprocessors. In other embodiments, a computing device 110 may include a personal computer, laptop computer, palm top computer, server computer, or workstation.

Computing devices 110 may be interconnected by a network of various communication links (e.g., electrical, fiber optic, and/or wireless links). Cluster 100 may span a large network or combination of networks (e.g., the Internet or a local intranet) and include multiple computing devices in some embodiments. In other embodiments, a cluster 100 may include a single computing device 110 on which multiple processes are executing.

In some embodiments, one or both clusters 100 may include the same type of node. For example, cluster 100A and 100B may each include one or more application server nodes. Each cluster 100 may be included in a different department of the same company in order to allow each department to host its own applications. In some embodiments, each cluster may include different types of nodes and/or be configured to provide different levels of quality of service and/or different types of services. For example, in one embodiment, cluster 100A may be a cluster of web server nodes 150A-150C and cluster 100B may include a cluster of application server nodes 150E-150G.

Clients 20 each send communications to one or both of clusters 100. Clusters 100 may responsively return communications to clients 20 and/or send communications to other nodes within the same or different clusters. These communications may be communicated using one or more standard protocols. For example, clients 20 may communicate with clusters 100 via TCP/IP (Transmission Control Protocol/Internet Protocol) and HTTP (Hyper Text Transfer Protocol). Communication within and between clusters 100 may involve JMS (Java™ Messaging Service) compliant message services and/or CORBA (Common Object Request Broker Architecture) communications.

Some types of communications are "sticky" in that, once a client 20 has established a connection with a particular node, additional communications from that client will continue to be handled by the same node for the duration of a client/node session. Other communications may be redirected such that any node of the appropriate type may respond to any client request, regardless of which node that client was communicating with earlier in the session.

In embodiments that include multiple clusters 100, a cluster router 40 may be included to route client requests (whether from clients 20 or from a node 150 included in one of clusters 100) to the appropriate cluster 100. Cluster router 40 may be included in a physical device such as a network interface card in some embodiments. In other embodiments, cluster router 40 may be a process, or engine, included in a communication server (as shown in more detail below with respect to FIG. 6). Note that the functionality of cluster router 40 may be included within one or more nodes 150 within each cluster 100 in some embodiments.

Cluster router 40 may be configured to route client communications to the appropriate cluster based on a cluster ID included in each communication. Each cluster ID may uniquely identifies a single cluster within a system. The cluster ID may be included in an ID within a standard protocol (e.g., the ID may be part of an HTTP ID used to identify HTTP sessions). Since a cluster ID distinctly identifies an entire cluster 100, as opposed to identifying a particular node within a cluster, cluster router 40 may be configured to route a client communication identifying a particular cluster to any node within the identified cluster. For example, if an ID also includes a node or virtual server ID, the cluster router 40 may select which node within the identified cluster to route the client communication to based on those additional ID(s). Alternatively, the cluster router 40 may maintain information identifying the functionality, location, and/or load at each node within the identified cluster and use that information to select which node within the identified cluster to which the client communication should be routed.

If cluster router 40 receives a communication from one of the external clients 20 that does not include a cluster ID, cluster router 40 may examine the communication to determine an appropriate cluster ID and encode that cluster ID in the communication. For example, cluster router 40 may select a cluster based on information such as requested functionality and/or geographic location of the requesting client 20. Cluster router 40 may then route the communication to a cluster based on the selected cluster ID.

In one embodiment, if cluster router 40 receives a client communication from a client node 150A within a cluster 100A and that communication does not include a cluster ID, cluster router 40 may determine that the absence of a cluster ID indicates that the client communication should be routed to another node 150B-150C within the initiating node's cluster 100A. Alternatively, cluster router 40 may be configured to handle such a client communication in the same way as an external client communication generated by an external node 20.

When each process, or engine, within a node 150 generates a responsive communication to a client request that includes a cluster ID, the process may be configured to include the cluster ID in the responsive communication. This way, the client may reuse the cluster ID in subsequent communications. For example, a client may initiate a session with a particular cluster process by sending a client communication lacking a cluster ID to clusters 100. Cluster router 40 may encode an appropriate cluster ID in the client communication and route the client communication to the appropriate cluster. When a cluster process returns a response to the client, the responsive communication may provide the cluster ID to the client in such a way that subsequent client communications in that session will include the cluster ID. For example, the cluster ID may be encoded in a URL returned to the client.

Use of a cluster ID in communications with clients provides the ability to identify a cluster directly. Current routing techniques often allow a cluster to be identified indirectly (e.g., by function, location, or other characteristics of that cluster), but communications with a cluster typically only identify directly a particular host within the cluster, not the cluster itself. This ability to directly identify a cluster provides routing flexibility if a particular node fails. For example, if a client 20B was communicating with node 150A and node 150A fails, cluster router 40 may be configured to select another node 150B or 150C within cluster 100A to handle subsequently received communications from that client 20B by examining the cluster ID and selecting another non-failed node within the same cluster 100A.

In some embodiments, client requests initiating a session may already include the appropriate cluster ID. Accordingly, the cluster router 40 may not need to encode an appropriate cluster ID in the communication. However, in other embodiments, clients 20 (and clients included in clusters 100) may not be configured to select an appropriate cluster ID to include in a client request (absent having already received a responsive communication including the cluster ID). Note also that embodiments that do not include multiple clusters 100 may not include a cluster router 40 and may not use cluster IDs when routing communications.

Figure 2:
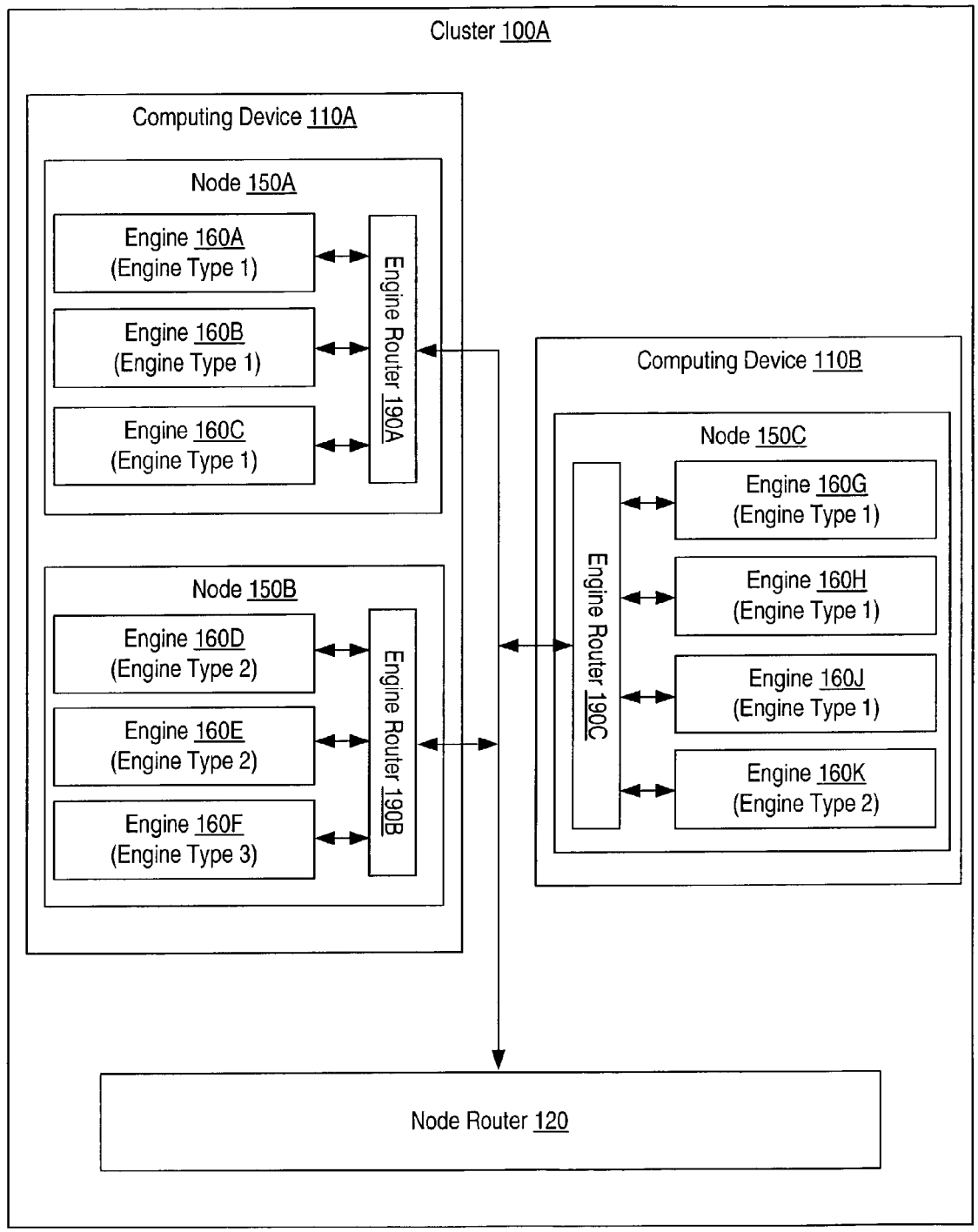
FIG. 2 is a block diagram of a cluster, according to one embodiment.

FIG. 2 illustrates more details of cluster 100A, according to one embodiment. In this embodiment, cluster 100A includes three nodes 150A-150C. Each node 150 may include one or more engines 160. As shown, node 150A includes engines 160A-160C, node 150B includes engines 160D-160F, and node 150C includes engines 160G-160K.

Nodes may have uniform and non-uniform roles within a cluster. The roles may be distinguished by the various types of engines included in each cluster. Nodes with uniform roles include at least some of the same types of engines (although each may include different numbers of those types of engines). Nodes with non-uniform roles include different types of engines. An engine may be any of various types of process and/or applications. For example, engines may include various types of servers (e.g., LDAP servers, administration servers, message servers such as one used to implement a cluster router 40, Sun ONE Servers, etc.) or processes (e.g., servlet engines, Java bean containers, session repositories, distributed data synchronizers, etc.). Providing nodes with non-uniform roles may allow functionally to be divided among the cluster nodes. For example, in a web server cluster, static pages may be handled by one set of one or more nodes, dynamic pages may be handled by another set of nodes, and a search engine may be handled by a third set of nodes.

Each cluster 100 may include a node router 120. Likewise, each node 150 may include an engine router 190. The node router 120 and the engine router 190 may themselves be engines included in one or more nodes within cluster 100. For example, a node router 120 engine may be included in each node 150 configured to receive client requests from clients 20 and/or from clients included in other clusters such as cluster 100B. An engine router 190 engine may be included in each node 150 in order to route client communications routed to that node to the appropriate engine 160 within that node. In other embodiments, all or part of node router 120's functionality may be included in one or more hardware devices (e.g., a network adapter used to facilitate communications between computing devices 110A and 110B).

Node router 120 may be configured to route client communications to various nodes within cluster 100A based on a node ID included in each client communication. Each node ID uniquely identifies a single node within a cluster, and each node included within a cluster may have at least one associated node ID. If a communication does not include a node ID, or if the node identified by a communication's node ID has failed, the node router 120 may select a node ID of a non-failed node within cluster 100A to encode within the communication.

Engine router 190 may be similarly configured to route client communications to various engines within a node 150 based on an engine ID included in each client communication. Each engine ID uniquely identifies a single engine within a node, and each engine within the node may have at least one associated engine ID.

Note that the same engine ID may be used to identify different engines in different nodes. In other words, the combination of the node ID and the engine ID may form an ID hierarchy in which the engine identified by a particular engine ID is dependent on which node is identified by the node ID. In embodiments that include cluster IDs, the cluster ID may also be part of the hierarchy such that the node identified by a particular ID is dependent on which cluster is identified by the cluster ID. In other words, while each node ID may be unique within a cluster, two different clusters may each include a node having the same node ID.

In some embodiments, node router 120 may include the functionality of engine router 190 (e.g., the two routers may be combined into a single routing engine). Such a node router 120 may select which node and engine a particular client communication should be routed to based on information such as the functionality requested by the communication, the current load within the cluster, the physical location of each cluster node relative to the requesting client, and so on. Note also that data availability within a cluster may determine which node(s) a client request may be routed to. In some embodiments, data may be distributed throughout a cluster such that certain nodes (e.g., a primary node and a backup node) have copies of portions of the data and other nodes do not have copies of those portions of the data. Thus, routing may depend on what data is specified in the client request and/or required in order to respond to the client request.

In some embodiments, the node router 120 may encode an engine type identifying the type of engine 160 that should handle the communication into the communication. The node router may then identify each node that includes at least one engine of that type. For example, if a communication requests a first type of engine (Engine Type 1 in FIG. 2), the node router 120 may identify nodes 150A and 150C as including that type of engine. The node router 120 may select one of the engines in one of the nodes to handle the request and encode the appropriate node ID and/or engine ID in the communication. The particular node and/or engine to route the client request to may be selected in a variety of ways, including randomly or based on location, load balancing, or other service conditions.

Note that in many embodiments, cluster routers 40, node routers 120, and/or engine routers 190 may not encode node IDs into client requests. Instead, these routers may select an appropriate cluster, node, and/or engine to which the client request should be routed. The receiving node and/or engine may itself encode its cluster, node, and/or engine IDs (and, in some embodiments, engine type) into responsive communications sent to the client. The client may use those cluster, node, and/or engine IDs in subsequent communications.

Figure 3:
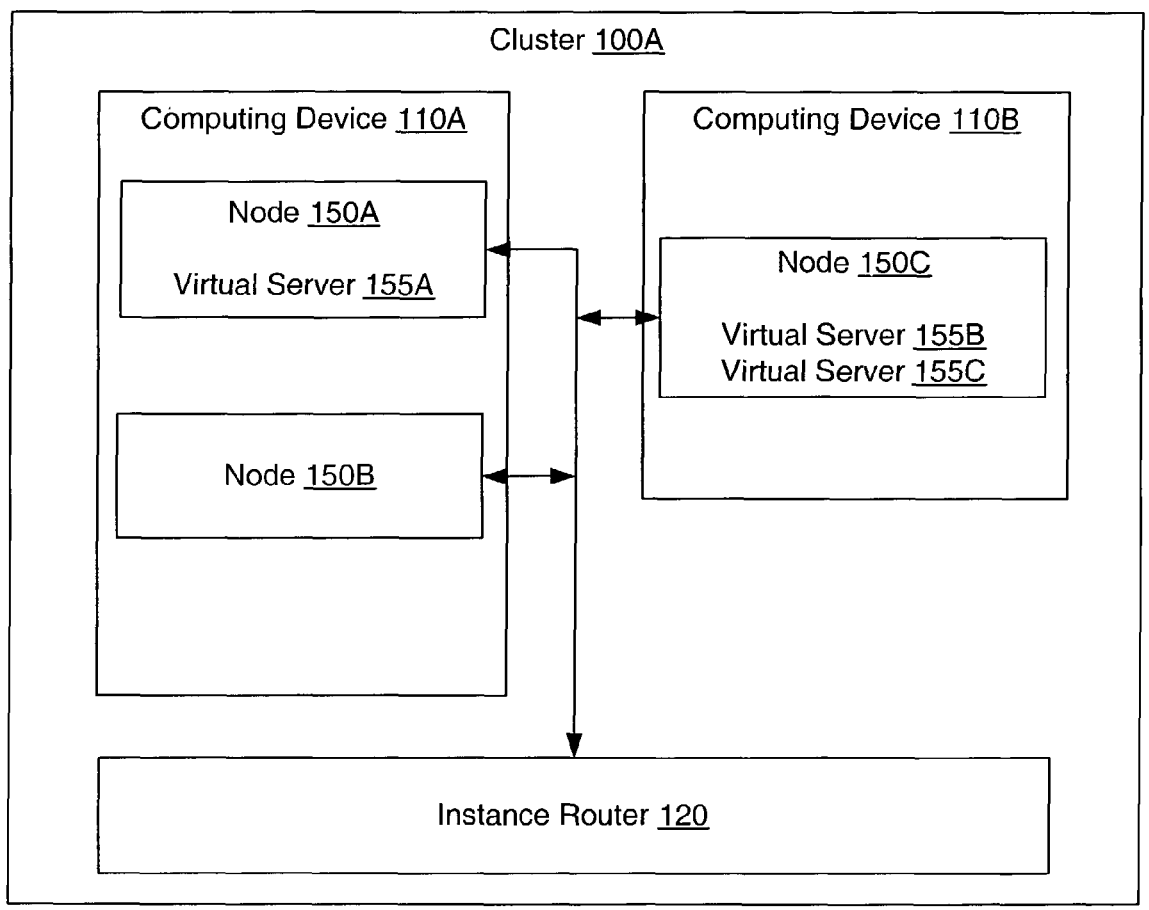
FIG. 3 shows another block diagram of a cluster, according to one embodiment.

FIG. 3 illustrates additional details of node 100A, according to one embodiment. Various nodes within a cluster 100A may implement one or more virtual servers. In the illustrated embodiment, node 150A implements virtual server 155A, node 150B does not implement any virtual servers, and node 150C implements two virtual servers 155B and 155C. A virtual server 155 may be implemented in a node or within an engine included in a node.

Virtual servers 155 may be defined to provide differing levels of quality of service to different clients. For example, clients 20 may correspond to "premium" and "regular" subscribers. Premium subscribers may pay fees for a certain level of quality of service. Regular subscribers, who pay reduced fees or no fees at all, may not be guaranteed the save quality of service as premium subscribers. Premium subscribers may access clusters 100 via a different virtual server than the regular subscribers. As client requests are routed within clusters 100, the ID of the virtual server to which the client request is directed may be used to select a node 150 and/or engine 160 that provides the appropriate quality of service indicated by that virtual server. The selected node ID and engine ID may then be encoded within the client request.

Virtual servers 155 may alternatively or additionally be used to provide "sandboxing" between different clients. Sandboxes are used to provide different environments that impose different restrictions on resource (e.g., CPU, memory, mass storage, and/or network) usage. Restrictions may be both quantitative (e.g., specifying a maximum or minimum resource usage) and qualitative (e.g., specifying that only certain memory locations are readable and/or writeable). For example, if clusters 100 are used to provide various customers' with web hosting, each customer's data may be sandboxed relative to the other customers' data via the use of virtual servers. Accordingly, client requests identifying a particular virtual server may only be allowed to access the data included within an associated sandbox. The sandboxing information may in turn indicate which node 150 and/or engine 160 a particular request should be routed to.

Thus, a node router 120 and/or engine router 190 may be configured to use a virtual server ID, if any, included in a particular client request to route that client request to an appropriate node and/or engine associated with that virtual server. If the particular node and/or engine subsequently fails during the session, the node router 120 and/or engine router 190 may use the virtual server ID to select another node and/or engine to which communications should be routed.

FIG. 4 illustrates an exemplary ID that may be included in a communication in one embodiment. As shown, an ID may include five ID fields that identify an engine within a node to which a communication including that ID should be routed. Three of the five fields form a hierarchy: cluster ID 402, node ID 404, and engine ID 408. The other fields, engine type ID 406, and virtual server ID 410, provide additional information that may be used to select a node and/or engine to which a client communication initiating a session may be routed and/ or to allow a client communication to be appropriately rerouted if a node and/or engine fails.

Note that some ID fields may not be included in some embodiments. For example, a cluster ID 402 may not be included in systems that only contain a single cluster. Similarly, if cluster nodes only contain one type of engine, the engine type field 406 may be excluded. Embodiments that do not implement virtual servers may not include a virtual server ID 410.

The ID shown in FIG. 4 (or an ID including at least some of the fields shown in FIG. 4) may be encapsulated in a communication and returned to a client according to a variety of existing protocols. For example, the ID may be included in the body 504 of a TCP/IP packet 500, as shown in FIG. 5. Alternatively, an ID including at least some of the fields shown in FIG. 4 may be encapsulated within the header 504 of a TCP/IP packet 500.

IDs including at least a portion of the fields shown in FIG. 4 may be used instead of and/or in addition to an ID format used in an existing protocol. For example, the ID may be included in an IOR (Interoperable Object Reference) used by a CORBA ORB (Object Request Broker), in HTTP sessions, in JMS end-points, or in any other ID used with a communication infrastructure that identifies, sorts, and/or manages communication channels between multiple processes. The ID may have a variable length if used with some protocols and a fixed length if used with other protocols.

Note that in some embodiments, using cluster, node, engine, engine type, and/or virtual server IDs may facilitate faster routing than is possible without the use of such IDs. Additionally, IDs that include at least some of the fields shown in FIG. 4 may facilitate "sticky" communications in which a client communicates with the same cluster, node, and/or engine for the duration of a client/server session. IDs such as the one shown in FIG. 4 may also provide improved data migration after node and/or engine failures. For example, if the engine identified in the engine ID field fails, a router may reroute the communication to another engine of the same type (as specified in the engine type field). If that engine is included in another node that does not have a copy of data (e.g., session data and/or data requested by the client) needed to handle the client request, the node may use the node and engine ID fields to determine which node or nodes have copies of the needed data and to obtain copies of the needed data from those node(s). An ID like the one shown in FIG. 4 may also allow efficient routing if a client request is received by a different cluster (e.g., due to an error or due to user choice) than the client communicated with earlier in the same session. In such a situation, a router may use the ID to select which cluster, node, and/or engine to which the client request should be rerouted.

Figure 6:
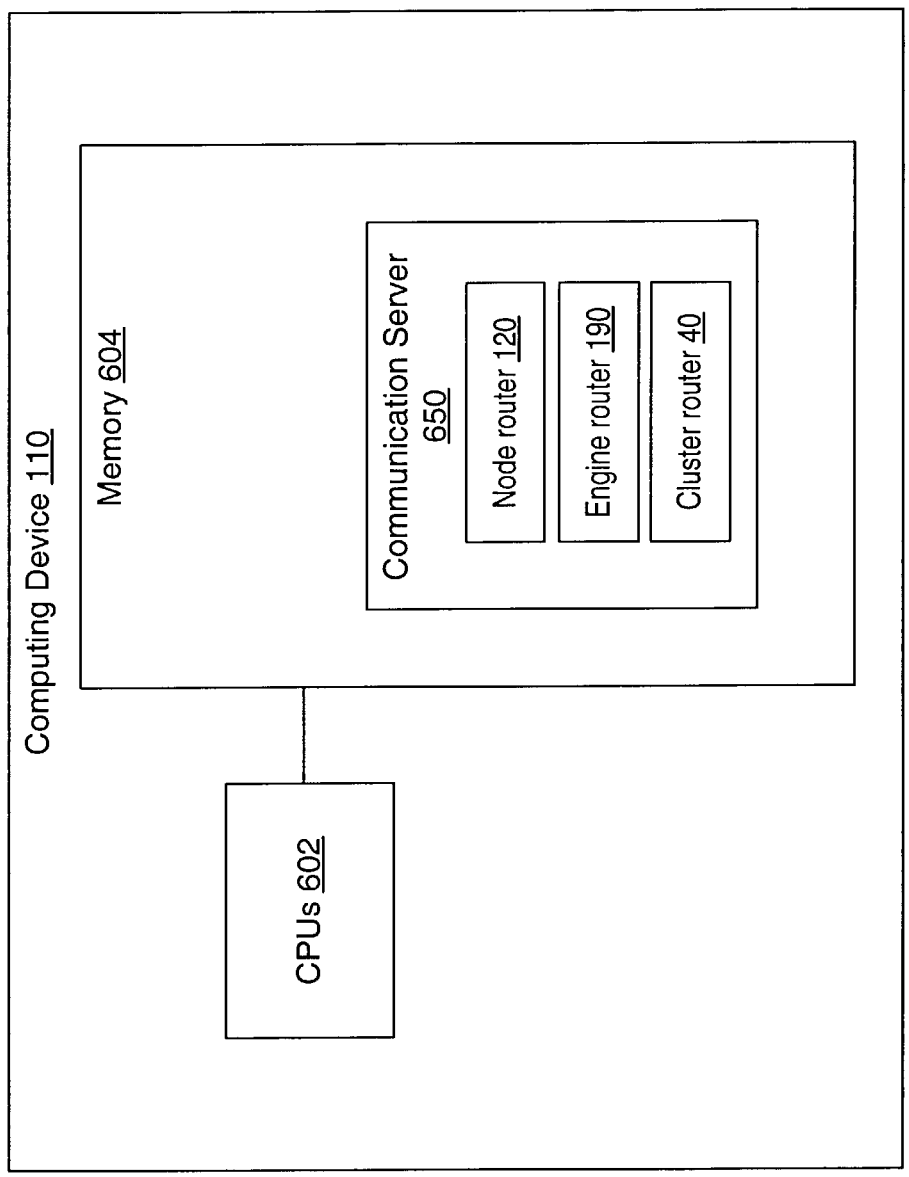
FIG. 6 illustrates a computing device configured according to one embodiment.

The cluster router 40, node router 120, and/or engine router 190 functionality may be included in a communication server application 650 executing on one or more of computing devices 110, as shown in FIG. 6. In one embodiment, routing using an ID including fields such as those shown in FIG. 4 may be a two-level process. For example, inter-cluster routing may be handled in hardware and/or in a naming service implementing the functionality of cluster router 40. Intra-cluster routing may be handled by another application or process such as communication server 650.

All or part of communication server application 650 may be stored in memory (e.g., RAM) 604 and executed by one or more CPUs 602. Portions of communication server application 650 may be paged in and out of memory 604 (e.g., to a mass storage media such as a hard disk).

Communication server 650 may be configured as Message-Oriented Middleware (MOM) in one embodiment. For example, engines 160 may be configured to send communications to communication server 650 instead of sending communications to other engines. The communication server 650 may in turn deliver the communications to the appropriate recipient engines using an ID such as the one shown in FIG. 4. For example, communication server 650 may use a node ID, engine ID, virtual server ID, and/or engine type ID to identify a destination engine 160 for each communication.

The communication server 650 may include functionality such as that provided by a CORBA ORB or a JMS compliant message server. The communication server may support prioritizing of communications (e.g., in one embodiment, prioritizing may be based, at least in part, on a virtual server ID included in a communication). The communication server 650 may also be configured to deliver communications synchronously and/or asynchronously, guarantee communication deliver, support message delivery notification, support message time-to-live, and/or support transactions.

In some embodiments, communication server 650 may be implemented as an engine in a particular node within a cluster. Alternatively, communication server 650 may be implemented as a node that includes multiple router 120, 190, and/or 40 engines.

Figure 7:
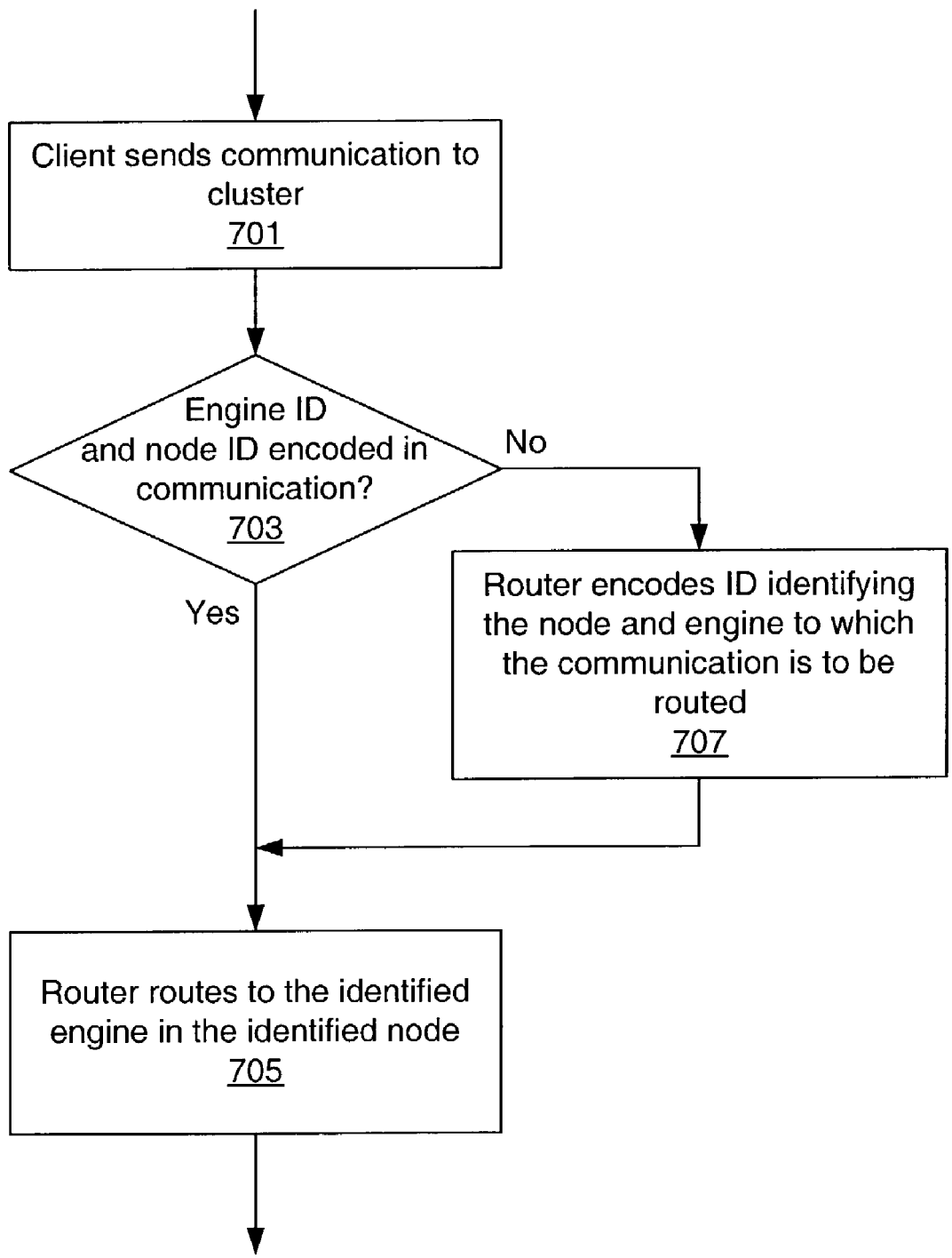
FIG. 7 is a flowchart of one embodiment of a method of routing a client communication using an ID that directly identifies a node and an engine within that node.

FIG. 7 is a flowchart of one embodiment of a method of routing communications within a cluster using an ID including at least an engine ID and a node ID. At 703, a client sends a communication to a cluster. The client may be external to the cluster, a node in another cluster, a node within the same cluster, or an engine within the same node. The communication may be sent using one or more of a variety of standard communication protocols.

If an engine ID and a node ID are included in the client communication, a router (e.g., a communication server 650 engine or node) may route the client communication to the identified engine in the identified node, as indicated at 705. Such IDs may be embedded within an ID used to route communications according to a standard communication protocol or embedded within the body of such a communication. If the engine and/or node IDs are not included in the communication, the router may select an engine and/or node to which the communication may be routed (e.g., based on location, load, functionality, quality of service, etc.) and, in some embodiments, encode the ID(s) of the selected engine and/or node in the communication, as shown at 707. The router may then route the communication to the selected engine in the selected node (e.g., by using the encoded IDs, as shown at 705).

Subsequent communications included in a session may include the same node ID and engine ID. For example, an engine within a cluster node may include the node ID and engine ID in a responsive communication returned to the client, allowing the client to include the node ID and engine ID in subsequent session communications.

Figure 8:
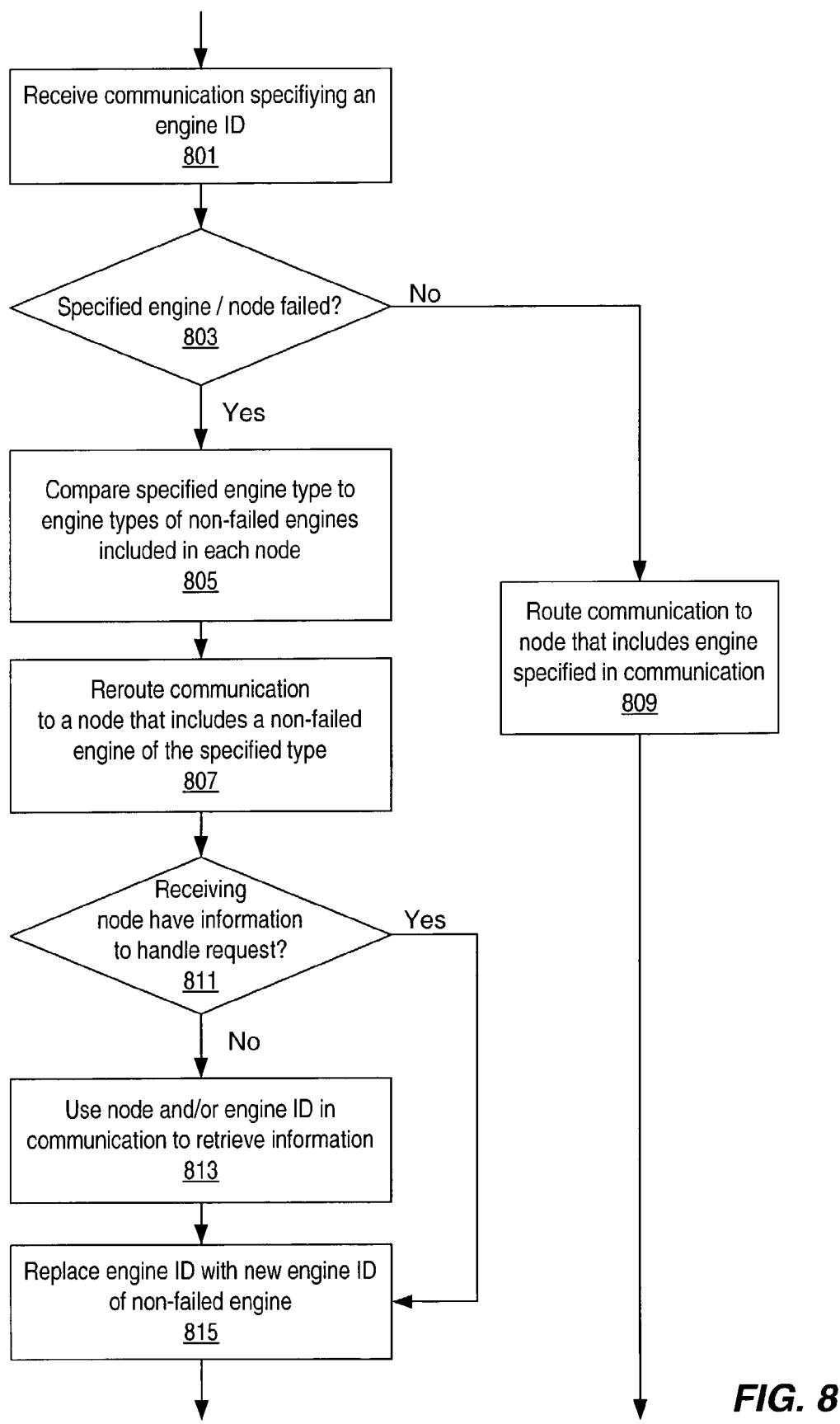
FIG. 8 is a flowchart of one embodiment of a method of rerouting a client communication that includes an ID identifying a failed engine by accessing an engine type field encoded in the ID.

If a node or engine is identified in a particular communication has failed, a communication may be rerouted based on additional ID fields included in the communication, as shown in FIG. 8. At 801, a client communication specifying a particular engine ID is received. The communication may also include a node ID of the node that includes the engine. If the specified engine or node has failed, as determined at 803, an engine type ID included in the communication may be compared to the types of non-failed engines included in each node, at 805. Based on which nodes include the appropriate type of engine, and on any other applicable factors (e.g., load, quality of service and/or sandboxing specified via a virtual server ID, physical location, etc.), the communication may be routed to another non-failed engine, as shown at 807.

In some embodiments, the node that receives the rerouted communication may not have information needed to handle the rerouted communication, as determined at 811. For example, the receiving node may not have session data corresponding to the session of which the communication is a part. The receiving node may also (or alternatively) lack a copy of data requested by the communication. If the receiving node does not have this information, the receiving node may use the node and/or engine ID encoded in the communication to determine which node(s) have a copy of the needed information and to retrieve the information from one of those nodes, as shown at 813. For example, the receiving node may request the information from the node identified in the communication. If that node is failed, the receiving node may use cluster topology information to retrieve the information from a node configured to store a backup copy of that information.

If the receiving node does have the information needed to handle the communication, the node may handle the request. When returning a response to the communication, the receiving node may encode the new node and/or engine ID in the responsive communication, as indicated at 815.

Note that in one alternative embodiment, the communication's engine ID (specifying the failed engine) may be replaced with the engine ID of the selected non-failed engine at 807. If the non-failed engine is included in a different node than identified by the communication, the communication's node ID may also be replaced. These new IDs may be used to route the communication, as indicated at 809.

If the specified engine and/or node identified in the communication is not determined to be failed at 803, the communication may be routed based on the engine ID and node ID included in the communication, as shown at 809.

Note that communications may similarly be rerouted using a cluster ID (e.g., to select another node within the identified cluster in response to a node failure) or a virtual server ID (e.g., to select another node and/or engine that provides an appropriate environment and/or quality of service identified by the virtual server ID).

Various embodiments may further include receiving, sending or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or communication media such as network and/or wireless links configured to convey signals such as electrical, electromagnetic, or digital signals.

It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
receiving a communication from a client;
routing the communication to a node included in a cluster of nodes, wherein the node is identified by a node ID included in the communication; and
routing the communication within the node to an engine of a plurality of engines included in the node, wherein the engine is identified by an engine ID included in the communication;
wherein the node ID uniquely identifies the node among the cluster of nodes and wherein the engine ID uniquely identifies the engine among the plurality of engines included in the node.

2. The method of claim 1, further comprising the engine encoding the node ID and the engine ID in a responsive communication to the client.

3. The method of claim 1, further comprising a router included in the cluster encoding the node ID and the engine ID in the communication in response to said receiving.

4. The method of claim 3, further comprising the router selecting the node ID from a plurality of node IDs dependent on a current load on each of the plurality of nodes identified by a respective one of the plurality of node IDs.

5. The method of claim 3, further comprising the router selecting the node ID from a plurality of node IDs dependent on a physical location of each of the plurality of nodes identified by a respective one of the plurality of node IDs relative to a physical location of the client.

6. The method of claim 3, further comprising the router selecting the node ID from a plurality of node IDs dependent on an engine type ID included in the communication and information identifying one or more engine types included in each of the plurality of nodes identified by a respective one of the plurality of node IDs.

7. The method of claim 6, further comprising the router selecting the engine ID from a plurality of engine IDs dependent on the engine type ID.

8. The method of claim 3, further comprising the router selecting the node ID and the engine ID dependent on a virtual server ID included in the communication and information identifying at least one of a quality of service and a sandbox associated with each engine included in the node.

9. The method of claim 1, wherein the node ID and the engine ID form a hierarchy.

10. The method of claim 1, further comprising routing the communication to the cluster of nodes in response to the communication including an ID uniquely identifying the cluster of nodes among a plurality of clusters.

11. The method of claim 1, further comprising:
receiving a second communication from the client, wherein the second communication includes the node ID and the engine ID;
prior to said receiving the second communication, detecting a failure of the engine identified by the engine ID;
in response to said receiving the second communication, routing the second communication to a second engine identified by a second engine ID dependent on an engine type ID included in the second communication, wherein the engine and the second engine are both an engine type identified by the engine type ID.

12. The method of claim 11, further comprising a node that includes the second engine requesting data from a node including the first engine dependent on the node ID included in the communication.

13. The method of claim 11, further comprising replacing the engine ID in the second communication with the second engine ID.

14. The method of claim 11, wherein said routing the second communication comprises routing the second communication to a second node of the plurality of nodes dependent on the engine type ID included in the second communication, wherein the second node includes the second engine.

15. The method of claim 14, further comprising replacing the node ID in the second communication with a second node ID identifying the second node.

16. The method of claim 11, wherein said routing the second communication to the second engine is further dependent on a virtual server ID included in the second communication.

17. The method of claim 16, wherein the virtual server ID indicates a quality of service to be provided to the client, and wherein the second engine is configured to provide the quality of service.

18. The method of claim 16, wherein the virtual server ID indicates a sandbox associated with the client, and wherein the second engine is configured to operate within the sandbox.

19. The method of claim 1, further comprising:
receiving a second communication from the client, wherein the second communication includes the node ID and the engine ID;
prior to said receiving the second communication, detecting a failure of the node identified by the node ID;
in response to said receiving the second communication, routing the second communication to a second node identified by a second node ID dependent on an engine type ID included in the second communication, wherein the node and the second node include at least one of a type of engine identified by the engine type ID.

20. The method of claim 19, further comprising replacing the node ID in the second communication with the second node ID.

21. The method of claim 19, wherein said routing the second communication to the second node is further dependent on a virtual server ID included in the second communication.

22. The method of claim 19, wherein said routing the second communication to the second node is further dependent on a cluster ID included in the second communication, wherein the cluster ID identifies the cluster that includes the node and the second node.

23. A computing device, comprising:
one or more processors; and
a memory coupled to the one or more processors and configured to store instructions executable by the one or more processors to:
receive a communication that includes a node ID and an engine ID;
route the communication to a node included in a cluster of nodes, wherein the node is uniquely identified among the cluster of nodes by the node ID; and
route the communication within the node to an engine of a plurality of engines included in the node, wherein the engine is uniquely identified among the plurality of engines by an engine ID.

24. The computing device of claim 23, wherein the instructions are further executable to encode the node ID and the engine ID in the communication.

25. The computing device of claim 24, wherein the instructions are further executable to select the node ID from a plurality of node IDs dependent on information identifying a current load on each of the plurality of nodes identified by a respective one of the plurality of node IDs.

26. The computing device of claim 24, wherein the instructions are further executable to select the node ID from a plurality of node IDs dependent on a physical location of each of the plurality of nodes identified by a respective one of the plurality of node IDs relative to a physical location of the client.

27. The computing device of claim 24, wherein the instructions are further executable to select the node ID from a plurality of node IDs dependent on an engine type ID included in the communication and information identifying one or more engine types included in each of the plurality of nodes identified by a respective one of the plurality of node IDs.

28. The computing device of claim 27, wherein the instructions are further executable to select the engine ID from a plurality of engine IDs dependent on the engine type ID.

29. The computing device of claim 24, wherein the instructions are further executable to select the node ID and the engine ID dependent on a virtual server ID included in the communication and information identifying at least one of a quality of service and a sandbox associated with each engine included in the node.

30. The computing device of claim 23, wherein the node ID and the engine ID form a hierarchy.

31. The computing device of claim 23, further comprising a network interface configured to route the communication to the cluster of nodes in response to the communication including an ID uniquely identifying the cluster of nodes among a plurality of clusters.

32. The computing device of claim 23, wherein the instructions are further executable to:
receive a second communication from the client, wherein the second communication includes the node ID and the engine ID;
detect a failure of the engine identified by the engine ID prior to receiving the second communication; and
in response to receiving the second communication and detecting the failure of the engine, route the second communication to a second engine identified by a second engine ID dependent on an engine type ID included in the second communication, wherein the engine and the second engine are both an engine type identified by the engine type ID.

33. The computing device of claim 32, wherein the instructions are further executable to replace the engine ID in the second communication with the second engine ID.

34. The computing device of claim 32, wherein the instructions are further executable to route the second communication by routing the second communication to a second node of the plurality of nodes dependent on the engine type ID included in the second communication, wherein the second node includes the second engine.

35. The computing device of claim 34, wherein the instructions are further executable to replace the node ID in the second communication with a second node ID identifying the second node.

36. The computing device of claim 32, wherein the instructions are further executable to route the second communication to the second engine dependent on a virtual server ID included in the second communication.

37. The computing device of claim 36, wherein the virtual server ID indicates a quality of service to be provided to the client, and wherein the second engine is configured to provide the quality of service.

38. The computing device of claim 36, wherein the virtual server ID indicates a sandbox associated with the client, and wherein the second engine is configured to operate within the sandbox.

39. The computing device of claim 23, wherein the instructions are further executable to:
receive a second communication from the client, wherein the second communication includes the node ID and the engine ID;
detect a failure of the node identified by the node ID prior to receiving the second communication;
in response to receiving the second communication and detecting the failure, route the second communication to a second node identified by a second node ID dependent on an engine type ID included in the second communication, wherein the node and the second node include at least one of a type of engine identified by the engine type ID.

40. The computing device of claim 39, wherein the instructions are further executable to replace the node ID in the second communication with the second node ID.

41. The computing device of claim 39, wherein the instructions are further executable to route the second communication to the second node dependent on a virtual server ID included in the second communication.

42. The computing device of claim 39, wherein the instructions are further executable to route the second communication to the second node dependent on a cluster ID included in the second communication, wherein the cluster ID identifies the cluster that includes the node and the second node.

43. A computer accessible storage medium, comprising instructions computer executable to:
receive a communication that includes a node ID and an engine ID;
route the communication to a node included in a cluster of nodes, wherein the node is uniquely identified among the cluster of nodes by the node ID; and
route the communication within the node to an engine of a plurality of engines included in the node, wherein the engine is uniquely identified among the plurality of engines by an engine ID.

44. The computer accessible storage medium of claim 43, wherein the instructions are further executable to encode the node ID and the engine ID in the communication.

45. The computer accessible storage medium of claim 44, wherein the instructions are further executable to select the node ID from a plurality of node IDs dependent on information identifying a current load on each of the plurality of nodes identified by a respective one of the plurality of node IDs.

46. The computer accessible storage medium of claim 44, wherein the instructions are further executable to select the node ID from a plurality of node IDs dependent on a physical location of each of the plurality of nodes identified by a respective one of the plurality of node IDs relative to a physical location of the client.

47. The computer accessible storage medium of claim 44, wherein the instructions are further executable to select the node ID from a plurality of node IDs dependent on an engine type ID included in the communication and information identifying one or more engine types included in each of the plurality of nodes identified by a respective one of the plurality of node IDs.

48. The computer accessible storage medium of claim 47, wherein the instructions are further executable to select the engine ID from a plurality of engine IDs dependent on the engine type ID.

49. The computer accessible storage medium of claim 44, wherein the instructions are further executable to select the node ID and the engine ID dependent on a virtual server ID included in the communication and information identifying at least one of a quality of service and a sandbox associated with each engine included in the node.

50. The computer accessible storage medium of claim 43, wherein the node ID and the engine ID form a hierarchy.

51. The computer accessible storage medium of claim 43, wherein the instructions are further executable to:
receive a second communication from the client, wherein the second communication includes the node ID and the engine ID;
detect a failure of the engine identified by the engine ID prior to receiving the second communication; and
in response to receiving the second communication and detecting the failure of the engine, route the second communication to a second engine identified by a second engine ID dependent on an engine type ID included in the second communication, wherein the engine and the second engine are both an engine type identified by the engine type ID.

52. The computer accessible storage medium of claim 51, wherein the instructions are further executable to route the second communication by routing the second communication to a second node of the plurality of nodes dependent on the engine type ID included in the second communication, wherein the second node includes the second engine.

53. The computer accessible storage medium of claim 50, wherein the instructions are further executable to route the second communication to the second engine dependent on a virtual server ID included in the second communication.

54. The computer accessible storage medium of claim 53, wherein the virtual server ID indicates a quality of service to be provided to the client, and wherein the second engine is configured to provide the quality of service.

55. The computer accessible storage medium of claim 53, wherein the virtual server ID indicates a sandbox associated with the client, and wherein the second engine is configured to operate within the sandbox.

56. The computer accessible storage medium of claim 43, wherein the instructions are further executable to:
receive a second communication from the client, wherein the second communication includes the node ID and the engine ID;
detect a failure of the node identified by the node ID prior to receiving the second communication;
in response to receiving the second communication and detecting the failure, route the second communication to a second node identified by a second node ID dependent on an engine type ID included in the second communication, wherein the node and the second node include at least one of a type of engine identified by the engine type ID.

57. The computer accessible storage medium of claim 56, wherein the instructions are further executable to replace the node ID in the second communication with the second node ID.

58. The computer accessible storage medium of claim 56, wherein the instructions are further executable to route the second communication to the second node dependent on a virtual server ID included in the second communication.

59. The computer accessible storage medium of claim 56, wherein the instructions are further executable to route the second communication to the second node dependent on a cluster ID included in the second communication, wherein the cluster ID identifies the cluster that includes the node and the second node.

60. A system, comprising:
means for routing a communication received from a client to a node of a plurality of nodes included in a cluster dependent on a node ID included in the communication, wherein the node ID uniquely identifies the node among the plurality of nodes; and
means for routing the communication within the node to an engine of a plurality of engines included in the node dependent on an engine ID included in the communication, wherein the engine ID uniquely identifies the engine among the plurality of engines included in the node.

* * * * *